United States Patent
Yoshii et al.

(10) Patent No.: US 7,628,492 B2
(45) Date of Patent: Dec. 8, 2009

(54) PROJECTION DISPLAY WITH DIRECT LIGHT SOURCE COOLING MEANS

(75) Inventors: Shouichi Yoshii, Habikino (JP); Hisashi Okada, Daito (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 379 days.

(21) Appl. No.: 11/421,149

(22) Filed: May 31, 2006

(65) Prior Publication Data

US 2006/0279711 A1    Dec. 14, 2006

(30) Foreign Application Priority Data

Jun. 1, 2005 (JP) .............................. 2005-161736

(51) Int. Cl.
G03B 21/16 (2006.01)
G03B 21/18 (2006.01)
G03B 21/26 (2006.01)
F21V 29/00 (2006.01)
F21V 7/00 (2006.01)
F21V 7/20 (2006.01)

(52) U.S. Cl. .............................. 353/61; 353/52; 353/57; 353/60; 362/294; 362/296; 362/345

(58) Field of Classification Search .................. 353/52, 353/57, 60–61, 97–98; 362/294, 296, 345
See application file for complete search history.

(56) References Cited

U.S. PATENT DOCUMENTS 3,701,895 A * 10/1972 Sweetser ..................... 362/264
3,703,635 A * 11/1972 Burkarth ..................... 362/300
6,364,492 B1 * 4/2002 Fujimori et al. ............. 353/119
6,398,366 B1 * 6/2002 Hara et al. ..................... 353/57
6,509,674 B1 * 1/2003 Nakagawa ................... 313/113

(Continued)

FOREIGN PATENT DOCUMENTS

JP    03-157636 A    7/1991

(Continued)

OTHER PUBLICATIONS

Hecht, Eugene; Optics: Third Edition; Published 1998 by Addison Wesley Longman, Inc.; p. 162 (note: not explicit recitation of apparatus, but describes first principle for collimation).*

(Continued)

*Primary Examiner*—Diane I Lee
*Assistant Examiner*—Jori S Byrne-Diakun
(74) *Attorney, Agent, or Firm*—Westerman, Hattori, Daniels & Adrian, LLP

(57) ABSTRACT

A projection display capable of preventing a reflector from damage and cooling a lamp at high efficiency. The projection display includes a light source which has a lamp and metallic reflector. The metallic reflector has an opening disposed above the light-emitting point of the lamp in the gravity direction. A duct has an end coupled to the opening and directs the air induced by a fan through the opening into the metallic reflector. The air then circulates within the metallic reflector to cool the light-emitting point of the lamp, and subsequently is released out of the metallic reflector through through-holes formed with a front glass and a flange of the metallic reflector.

6 Claims, 13 Drawing Sheets

U.S. PATENT DOCUMENTS

| | | | |
|---|---|---|---|
| 6,575,599 | B1 | 6/2003 | Imamura et al. |
| 6,698,899 | B2 * | 3/2004 | Yamada et al. ............... 353/61 |
| 7,147,349 | B2 * | 12/2006 | Kato et al. ................. 362/294 |
| 7,380,963 | B2 * | 6/2008 | Maes et al. ................. 362/294 |
| 2002/0024811 | A1 * | 2/2002 | Horikawa ................... 362/264 |
| 2004/0085768 | A1 | 5/2004 | Kai et al. |
| 2004/0207306 | A1 * | 10/2004 | Horiuchi et al. ............. 313/113 |
| 2004/0228130 | A1 | 11/2004 | Kato et al. |
| 2006/0050512 | A1 * | 3/2006 | Nakagawa et al. .......... 362/264 |
| 2006/0232973 | A1 * | 10/2006 | Haga et al. ................. 362/264 |

FOREIGN PATENT DOCUMENTS

| | | | |
|---|---|---|---|
| JP | 05-325902 | A | 12/1993 |
| JP | 07-281296 | A | 10/1995 |
| JP | 2000-036215 | A | 2/2000 |
| JP | 2002-189252 | A | 7/2002 |
| JP | 2002-367417 | A | 12/2002 |
| JP | 2004-158447 | A | 6/2004 |
| JP | 2004-258211 | A | 9/2004 |

OTHER PUBLICATIONS

Notification of Reason(s) for Refusal issued in corresponding Japanese Application No. 2005-161736 dated May 26, 2009 (dispatch date).

Chinese Office Action dated Sep. 12, 2008, issued in corresponding Chinese Patent Application No. 2006100845978.

* cited by examiner

PROJECTION DISPLAY WITH DIRECT LIGHT SOURCE COOLING MEANS

The priority application Number JP2005-161736 upon which this patent application is based is hereby incorporated by reference.

BACKGROUND OF THE INVENTION

1. Field of the Invention

This invention relates to a projection display that displays color images.

2. Description of Related Art

Conventionally, projectors are used in presentations at business meetings, academic conferences, exhibitions, or other events or for watching movies at home. Such projectors modulate light, which is emitted from a light source provided in an external case of the projector, on the basis of image information to form an optical image, and magnify and project the optical image. In order to display the projected optical image more sharply, it is required of a light source lamp of recent projectors to provide higher brightness.

High pressure mercury lamps, metal halide lamps or the like are used as the light source lamp of the projectors. However, these lamps are disposable and require replacement. In addition, if an arc tube made of quartz or the like is use, it may explode as the lamp approaches the end of its life span, scattering its broken shards within the projector. Further, as the light source lamp generates a higher brightness it also generates greater heat, and therefore a means of expelling the generated heat outside to cool the light source lamp is needed to prevent the explosion of the light source lamp.

In the conventional light source devices having a cooling mechanism for a light source lamp, the light source device as disclosed in Japanese unexamined patent publication No. 2004-258211 is known. FIG. 14 is a schematic view of the conventional light source device. Referring to FIG. 14, the conventional light source device 400 includes a light source 401, a reflector 402, a light transmissive member 403 and a housing 404.

The light transmissive member 403 covers the luminous flux emitting surface of the reflector 402. The housing 404 houses the light source 401, reflector 402 and light transmissive member 403. The reflector 402 is provided with an aperture part 402A, while the housing 404 is provided with an aperture part 404A.

The aperture part 404A in the housing 404 is provided at a position opposed to the aperture part 402A in the reflector 402. The aperture part 404A is coupled to a duct 405 with an opening on the luminous flux emitting surface side.

When the light source device 400 is attached to an optical apparatus, the duct 405 juts from the luminous flux emitting surface so as to couple to a fan 410. With this action, the aperture part 404A is opened and air from the fan 410 is drawn into the reflector 402 as shown by arrow A. The air drawn into the reflector 402 then passes through the reflector 402 and is released from an aperture part 402B of the reflector 402 as shown by arrow B, thereby cooling the light source 401.

However, the conventional light source device as disclosed in JP No. 2004-258211 has a problem of low cooling efficiency since the air drawn into the reflector passes near the luminous flux emitting surface that is away from the light emitting point.

The conventional light source device also has a problem that the reflector if made of glass, may sustain damage by the possible explosion of the lamp.

SUMMARY OF THE INVENTION

The present invention is made to solve such problems and has an object to provide a projection display providing the prevention of damage to a reflector and high cooling efficiency for the lamp.

According to the present invention, the projection display includes a light source, projection unit and cooling unit. The light source emits white light. The projection unit projects images with the white light on a screen. The cooling unit cools the light source. The light source includes a lamp and metallic reflector. The metallic reflector reflects the white light emitted from the lamp and directs the collimated white light to the projection unit. The lamp is disposed so that its light emitting point lies on the focal point of the metallic reflector. The metallic reflector has an opening section provided at an intersection of a straight line extending via the focal point in a direction perpendicular to the direction in which the collimated white light travels and the metallic reflector. The cooling unit cools the lamp and/or metallic reflector through the opening section.

Preferably, the opening section is disposed above the focal point in the gravity direction. The cooling unit includes a duct and a fan. The duct has an end coupled to the opening section. The fan blows air through the duct and opening section into the metallic reflector.

Preferably, the light source further includes a glass provided on a side from which the collimated white light is emitted. The light source also includes through-holes extending in and out of the metallic reflector at a position in contact between the glass and metallic reflector.

Preferably, the opening section includes a first opening and a second opening. The first opening is disposed above the focal point in the gravity direction. The second opening is provided at an approximately opposed position to the first opening with the focal point at the center thereof in the gravity direction. The cooling unit includes a duct and a fan. The duct has an end coupled to the first opening. The fan blows air through the duct and the first opening into the metallic reflector.

Preferably, the light source further includes a reflecting mirror that is provided outside of the second opening and reflects the white light from the lamp into the metallic reflector.

Preferably, the light source further includes a glass provided on a side from which the collimated white light is emitted. The metallic reflector further has another opening which is provided below the focal point in the gravity direction and in the vicinity of a contact part between the glass and the metallic reflector. An opening is disposed above the focal point in the gravity direction. The cooling unit includes a duct and a fan. The duct has an end coupled to the opening. The fan blows air into the metallic reflector through the duct and opening.

Preferably, the metallic reflector has a part, which is approximately straight in cross section in a traveling direction of the collimated white light, in the vicinity of the contact part. Another opening is provided on the approximately straight part in cross section.

Preferably, the metallic reflector is approximately parabolic in form. The cooling unit includes a fan blowing air from the top of the parabolic form toward the opening section along the outer surface of the metallic reflector.

According to the projection display of the present invention, the lamp of the light source is cooled by the air induced into the metallic reflector through the opening section provide at the intersection of a straight line extending via the focal point (corresponding to the light-emitting point of the lamp) in a direction perpendicular to the traveling direction of the white light emitted from the light source and the metallic reflector. Thus, air directly cools the light-emitting point of the lamp.

According to the present invention, it is possible to prevent the reflector from damage and cool the lamp effectively.

Figure 1:
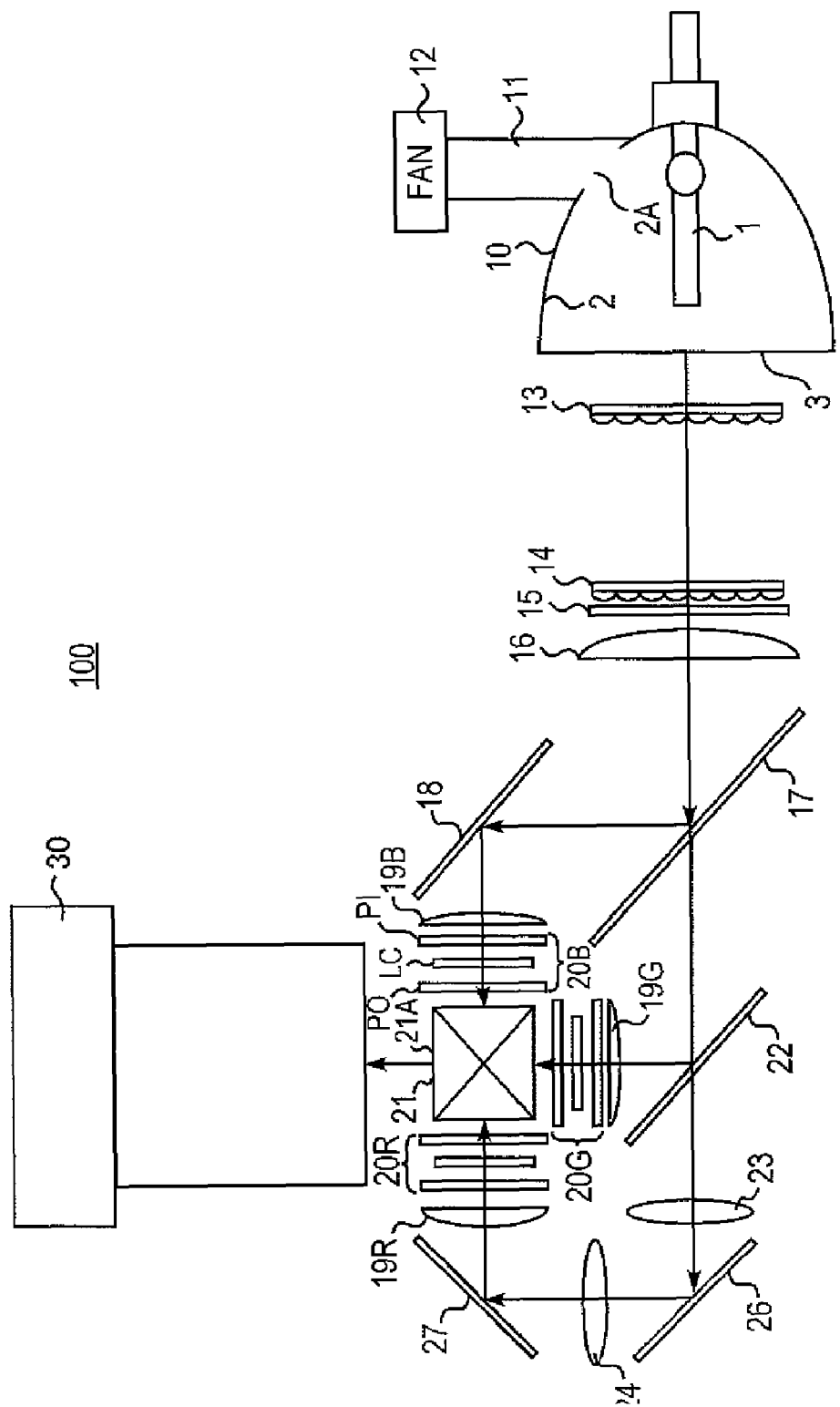
FIG. 1 is a schematic view of a projection display according to the first embodiment of the present invention.

The foregoing and other objects, features, aspects and advantages of the present invention will become more apparent from the following detailed description of the present invention when reviewed in conjunction with the accompanying drawings.

DETAILED DESCRIPTION OF THE PREFERRED EMBODIMENTS

Descriptions now will be made on embodiments of the present invention with reference to the drawings. The same or equivalent elements in the drawings are denoted with the same reference numbers, and the descriptions are not repeated.

The First Embodiment

FIG. 1 is a schematic view of a projection display according to the first embodiment of the present invention. Referring to FIG. 1, a projection display 100 according to the first embodiment of the invention includes a light source 10, a duct 11, a fan 12, fly-eye lenses 13, 14, and a polarizing converter 15, condenser lenses 16, 19B, 19G, 19R, and dichroic mirrors 17, 22, and total reflection mirrors 18, 26, 27, and liquid crystal display elements 20B, 20G, 20R, and a dichroic prism 21, lenses 23, 24 and a projection lens 30.

The light source 10 includes a lamp 1, a metallic reflector 2 and a front glass 3. The lamp 1 is disposed inside the metallic reflector 2. The metallic reflector 2 has an opening 2A. The front glass 3 covers the light-emitting surface of the metallic reflector 2.

The duct 11 has an end coupled to the opening 2A of the metallic reflector 2. The fly-eye lenses 13, 14, and each consisting of convex lenses so as to be a fly-eye integrator, are opposed to the front glass 3 of the light source 10. The polarizing converter 15 is disposed between the fly-eye lens 14 and condenser lens 16. The condenser lens 16 is disposed between the polarizing converter 15 and dichroic mirror 17.

The dichroic mirror 17 is disposed in the middle of the total reflection mirror 18, dichroic mirror 22 and condenser lens 16. The total reflection mirror 18 is disposed between the dichroic mirror 17 and condenser lens 19B.

The condenser lens 19B is disposed between the total reflection mirror 18 and liquid crystal display element 20B. The condenser lens 19G is disposed between the liquid crystal display element 20G and dichroic mirror 22. The condenser lens 19R is disposed between the liquid crystal display element 20R and total reflection mirror 27.

The liquid crystal display element 20B is disposed between the condenser lens 19B and dichroic prism 21. The liquid crystal display element 20G is disposed between the condenser lens 19G and dichroic prism 21. The liquid crystal display element 20R is disposed between the condenser lens 19R and dichroic prism 21. Each of the liquid crystal display elements 20B, 20G, 20R and includes a polarizer for input PI, liquid crystal LC and polarizer for output PO.

The dichroic prism 21 is disposed in the middle of the liquid crystal display elements 20B, 20G, 20R and projection lens 30. The dichroic mirror 22 is disposed in the middle of the condenser lens 19G, lens 23 and dichroic mirror 17. The lens 23 is disposed between the dichroic mirror 22 and total reflection mirror 26. The total reflection mirror 26 is disposed between the lenses 23 and 24. The lens 24 is disposed between the total reflection mirrors 26 and 27. The total reflection mirror 27 is disposed between the condenser lens 19R and lens 24. The projection lens 30 is opposed to the light-emitting surface 21A of the dichroic prism 21.

The light source 10 converts white light emitted from the lamp 1 into collimated white light and emits it from the front glass 3 to the fly-eye lens 13. The duct 11 directs air from the fan 12 via the opening 2A into the metallic reflector 2. The fan 12 directs air through the duct 11 and opening 2A into the metallic reflector 2.

The fly-eye integrator, which consists of the fly-eye lenses 13 and 14, splits the white light emitted from the light source 10 into beams and converges the split white light beams which then enter the polarizing converter 15. The polarizing converter 15 aligns the polarizing direction of each split white light beam received from the fly-eye lens 14 and emits it to the condenser lens 16. The condenser lens 16 directs the white light from the polarizing converter 15 to the dichroic mirror 17.

Out of the white light from the condenser lens 16, the dichroic mirror 17 reflects blue wavelength light toward the total reflection mirror 18, while allowing light having wavelengths from red to green to pass therethrough to enter the dichroic mirror 22.

The total reflection mirror 18 bends the optical path of the blue wavelength light, received from the dichroic mirror 17, at 90 degrees to direct the blue light to the condenser lens 19B. The condenser lens 19B directs the blue wavelength light from the total reflection mirror 18 to the liquid crystal display element 20B. The liquid crystal display element 20B optically modulates the blue wavelength light from the condenser lens 19B according to an input signal and allows the modulated blue wavelength light to enter the dichroic prism 21.

The dichroic mirror 22 reflects green wavelength light out of the light having wavelengths from red to green received from the dichroic mirror 17 to the condenser lens 19G, while allowing red wavelength light to pass therethrough to enter the lens 23.

The condenser lens 19G directs the green wavelength light received from the dichroic mirror 22 to the liquid crystal display element 20G. The liquid crystal display element 20G optically modulates the green wavelength light received from the condenser lens 19G according to an input signal and allows the modulated green wavelength light to enter the dichroic prism 21.

The lens 23 directs the red wavelength light from the dichroic mirror 22 to the total reflection mirror 26, which then bends the optical path of the red wavelength light at 90 degrees to direct the red wavelength light to the lens 24. The lens 24 directs the red wavelength light from the total reflection mirror 26 to the total reflection mirror 27, which then directs the red wavelength light to the condenser lens 19R.

The condenser lens 19R directs the red wavelength light from the total reflection mirror 27 to the liquid crystal display element 20R, which then optically modulates the red wavelength light from the condenser lens 19R according to an input signal and allows the modulated red wavelength light to enter the dichroic prism 21.

The dichroic prism 21 bends optical paths of the blue wavelength light and red wavelength light received from the liquid crystal display element 20B and 20R respectively at 90 degrees, while allowing the green wavelength light from the liquid crystal display element 20G to pass therethrough without bending its optical path in order to let the blue wavelength light, green wavelength light and red wavelength light enter the projection lens 30. The projection lens 30 enlarges and projects the blue wavelength light, green wavelength light and red wavelength light received from the dichroic prism 21 to form an image on a screen (not shown).

Figure 2:
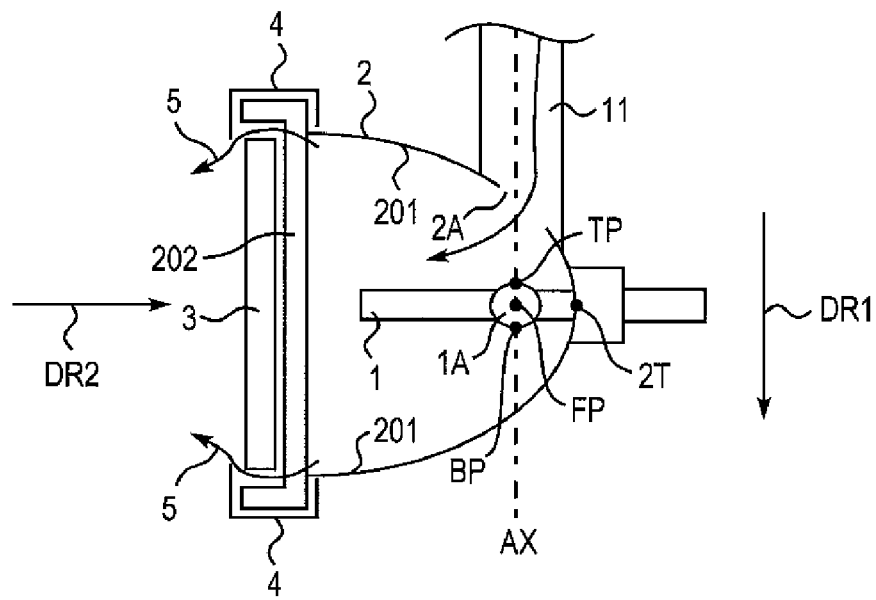
FIG. 2 is a schematic view describing a light source shown in FIG. 1 in detail.

FIG. 2 is a schematic view describing the light source 10 shown in FIG. 1 in detail. Referring to FIG. 2, the lamp 1 is fixed within the metallic reflector 2 such that the light-emitting point 1A of the lamp 1 corresponds with the focal point FP of the metallic reflector 2. The focal point FP, for example, is formed 6 mm away from the top 2T of the metallic reflector 2.

The metallic reflector 2 has a cross-sectional profile in approximately parabolic form along the gravity direction DR1. Incidentally, the metallic reflector 2 takes an approximately parabolic shape as a whole. The metallic reflector 2 has an inner surface 201, made of aluminum (Al), which reflects the white light from the lamp 1 to emit collimated white light through the front glass 3.

The opening 2A of the metallic reflector 2 has a diameter, for example, of 3 mm and is provided above the focal point FP in the gravity direction DR1. The opening ZA and focal point FP are aligned on an axis line AX extending in the gravity direction DR1. The metallic reflector 2 has a flange 202 on which the front glass 3 is fixed with clips 4.

Figure 3:
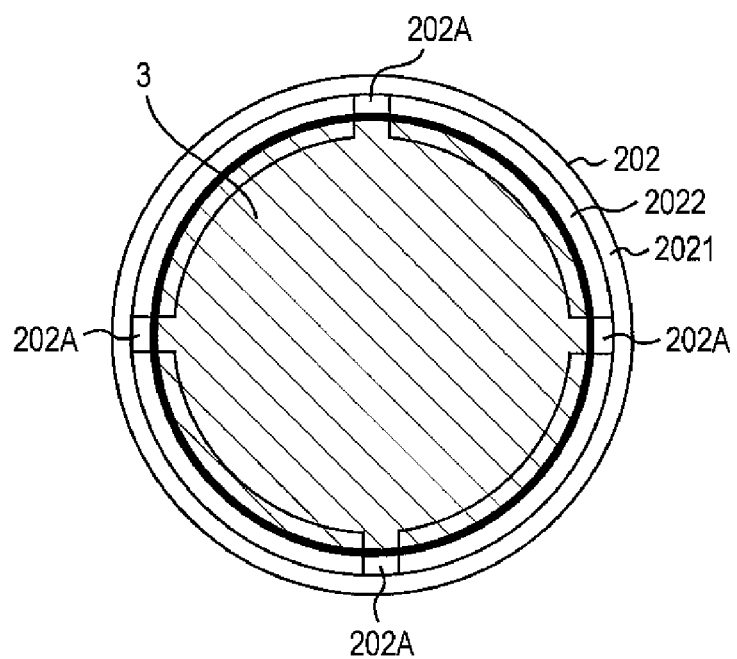
FIG. 3 is a plan view of the light source when viewed from the direction DR2 shown in FIG. 2.

FIG. 3 is a plan view of the light source 10 when viewed from the direction DR2 shown in FIG. 2. Note that the lamp 1 is omitted in FIG. 3. Referring to FIG. 3, the flange 202 has an outer peripheral portion 2021 and inner peripheral portion 2022. The outer peripheral portion 2021 protrudes further than the inner peripheral portion 2022 frontward from the drawing. The inner peripheral portion 2022 has cut-away sections 202A. The front glass 3 has a diameter smaller than the outer diameter of the inner peripheral portion 2022 of the flange 202 and is placed on the inner peripheral portion 2022. Thus a part of each cut-away section 202A is not covered with the front glass 3, and therefore functions as a through-hole extending in and out of the metallic reflector 2.

Referring back to FIG. 2, when the lamp 1 lights on, temperature rises to 850 degrees C. on average (within the range of 800 to 900 degrees C.) at the top part TP of the light-emitting point 1A of the lamp 1, while approximately 700 degrees C. at the bottom part BP of the light-emitting point 1A. Thus, the top part TP of the light-emitting point 1A is higher in temperature than the bottom part BP.

The fan 12 directs air through the duct 11 and opening 2A into the metallic reflector 2. More specifically, the air from the fan 12 is directed into the metallic reflector 2 so as to pass near the top part TP that is higher in temperature than other parts of the light-emitting point 1A of the lamp 1. The air induced into the metallic reflector 2 then circulates within the metallic reflector 2 to cool the light-emitting point 1A of the lamp 1 and the inner surface 201 of the metallic reflector 2, subsequently, as shown by arrow 5, the air is released from the cut-away sections 202A (see FIG. 3), which function as through-holes, out of the metallic reflector 2.

As discussed above, in the first embodiment, the light-emitting point 1A is cooled from the hotter part (i.e. top part TP) by the air induced into the metallic reflector 2 through the opening 2A provided above the light-emitting point 1A of the lamp 1, and the air used for cooling is released out of the metallic reflector 2 from the front glass 3 side. The metallic reflector 2, which houses the lamp 1, is made of metal.

Therefore, it is possible to prevent the reflector from damage and to cool the lamp 1 effectively.

The Second Embodiment

Figure 4:
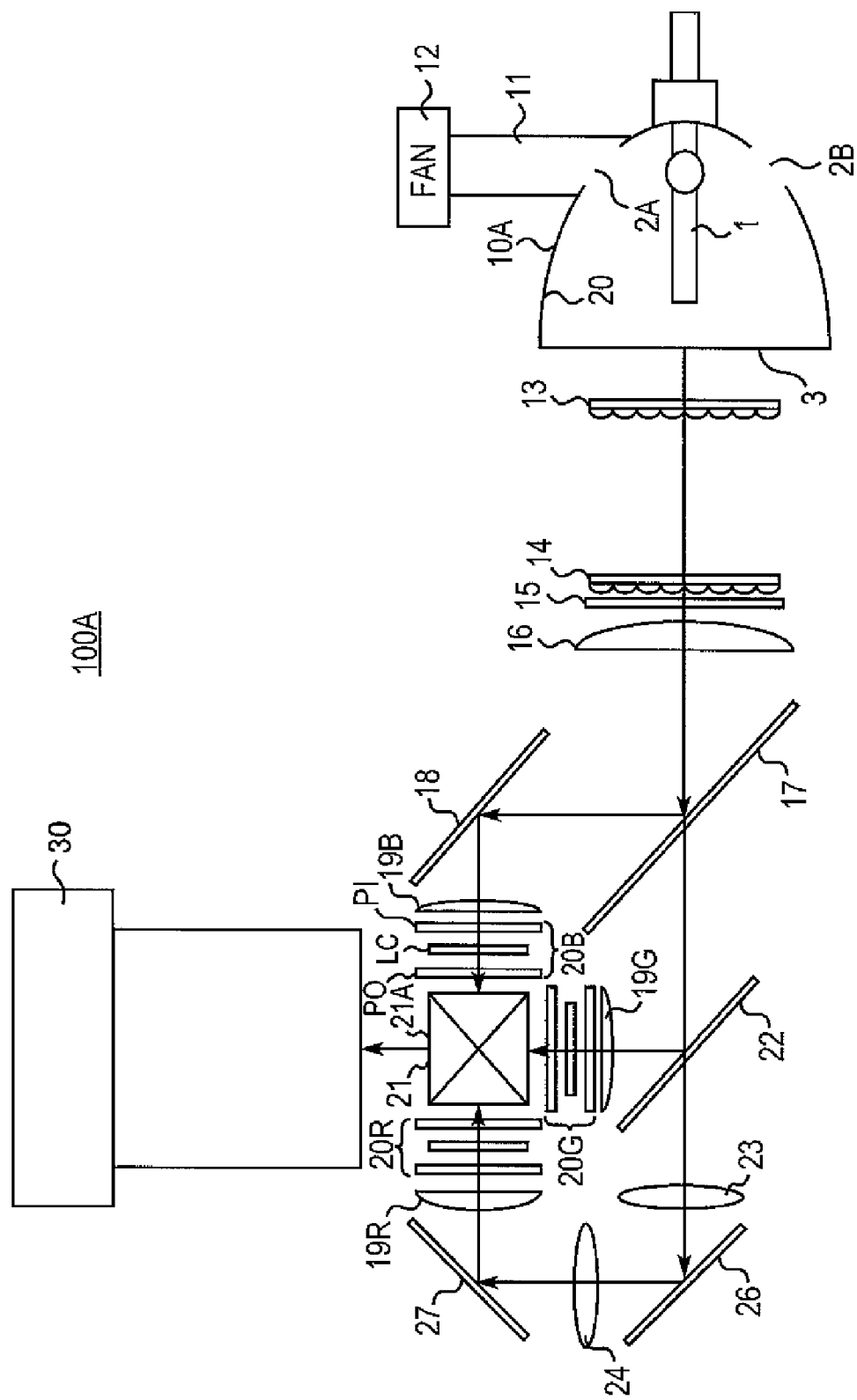
FIG. 4 is a schematic view of a projection display according to the second embodiment.

FIG. 4 is a schematic view of a projection display according to the second embodiment. Referring to FIG. 4, the projection display 100A according to the second embodiment is identical to the projection display 100 shown in FIG. 1 except for light source 10A as a substitute for the light source 10 of the projection display 100.

The light source 10A is identical to the light source 10 shown in FIG. 1 except for a metallic reflector 20 as a substitute for the metallic reflector 2 of the light source 10. The metallic reflector 20 is identical to the metallic reflector 2 shown in FIG. 1 but has an additional opening 2B.

Figure 5:
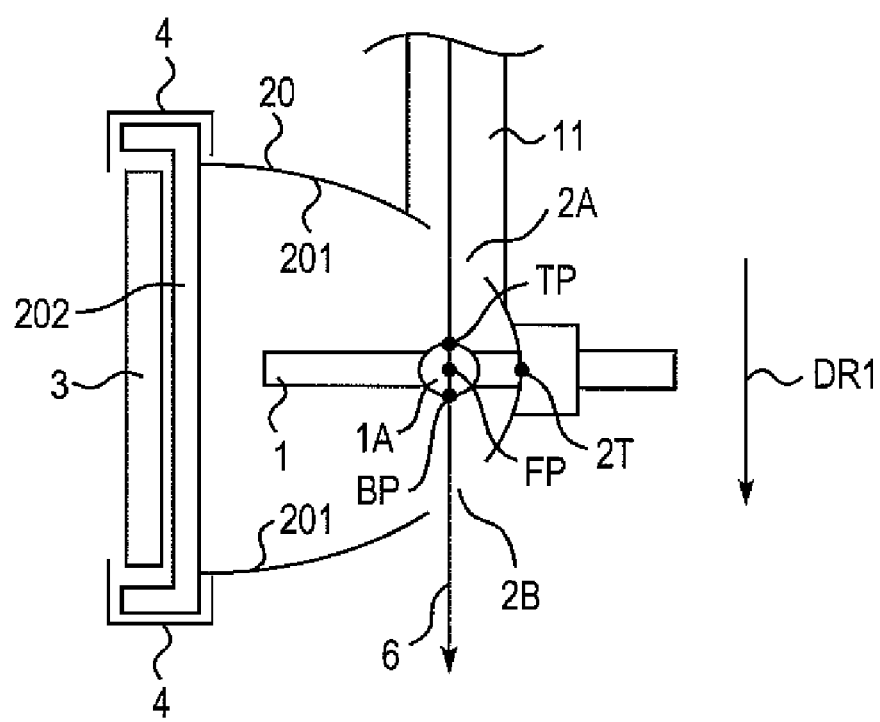
FIG. 5 is a schematic view describing a light source shown in FIG. 4 in detail.

FIG. 5 is a schematic view describing the light source 10A shown in FIG. 4 in detail. Referring to FIG. 5, the opening 2B is provided at an opposed position to the opening 2A in the gravity direction DR1 with the focal point FP at the center thereof. The opening 2B has a diameter, for example, of 3 mm.

With the provision of the opening 2B, air, which is induced into the metallic reflector 20 by the fan 12, cools the light-emitting point 1A of the lamp 1 from the top part TP to the bottom part BP and is released from the opening 2B to the outside of the metallic reflector 20. In short, the air induced in the metallic reflector 20, as shown by arrow 6, cools the light-emitting point 1A and is then released out of the metallic reflector 20.

As a result, the air that absorbed heat from the light-emitting point 1A of the lamp 1 is released out of the metallic reflector 20 with almost no air staying in the metallic reflector 20. Therefore, it is possible to cool the lamp 1 more effectively as well as prevent the metallic reflector 20 from a temperature rise.

The other elements of the second embodiment are the same as those of the first embodiment.

The Third Embodiment

Figure 6:
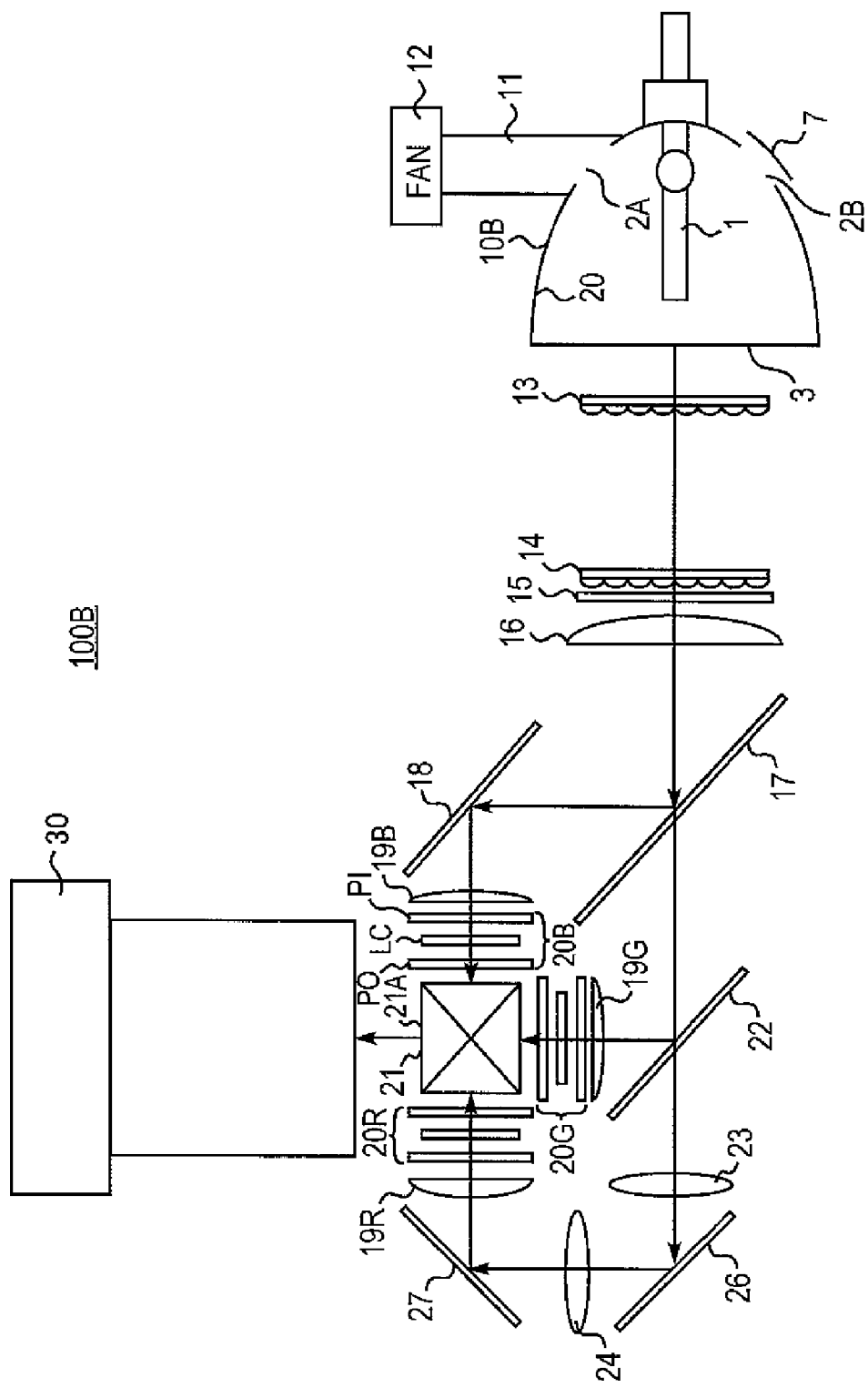
FIG. 6 is a schematic view of a projection display according to the third embodiment.

FIG. 6 is a schematic view of a projection display according to the third embodiment. Referring to FIG. 6, the projection display 100B according to the third embodiment is identical to the projection display 100A shown in FIG. 4 except for a light source 10B as a substitute for the light source 10A of the projection display 100A.

The light source 10B is identical to the light source 10A shown in FIG. 4, but has an additional reflecting mirror 7.

Figure 7:
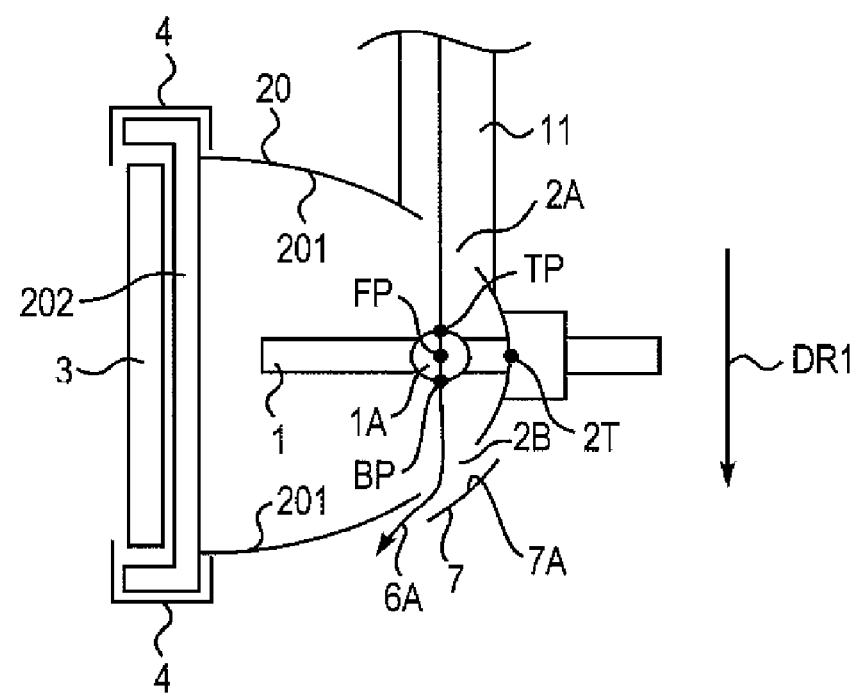
FIG. 7 is a schematic view describing a light source shown in FIG. 6 in detail.

FIG. 7 is a schematic view describing the light source 10B shown in FIG. 6 in detail. Referring to FIG. 7, the reflecting mirror 7 is opposed to the opening 2B of the metallic reflector 20. In this embodiment, the spacing between the reflecting mirror 7 and the metallic reflector 20 ranges from 1 mm to 2 mm. The reflecting mirror 7 includes an inner surface 7A that is made of aluminum and reflects white light from the light-emitting point 1A of the lamp 1 into the metallic reflector 20.

The air induced into the metallic reflector 20 by the fan 12 cools the light-emitting point 1A of the lamp 1 from the top part TP to the bottom part BP, and is then released through the opening 2B out of the metallic reflector 20 as shown by arrow 6A.

In the third embodiment, as discussed above, the light-emitting point 1A of the lamp 1 is air-cooled effectively by using the openings 2A, 2B which are approximately opposed to each other with the focal point FP of the metallic reflector 20 at the center thereof, while the white light that is not reflected by the metallic reflector 20 is reflected back into the metallic reflector 20 by the reflecting mirror 7.

Therefore, it is possible to cool the lamp 1 effectively without decreased lightness of images to be projected on the screen.

The other elements of the third embodiment are the same as those of the first and second embodiments.

The Fourth Embodiment

Figure 8:
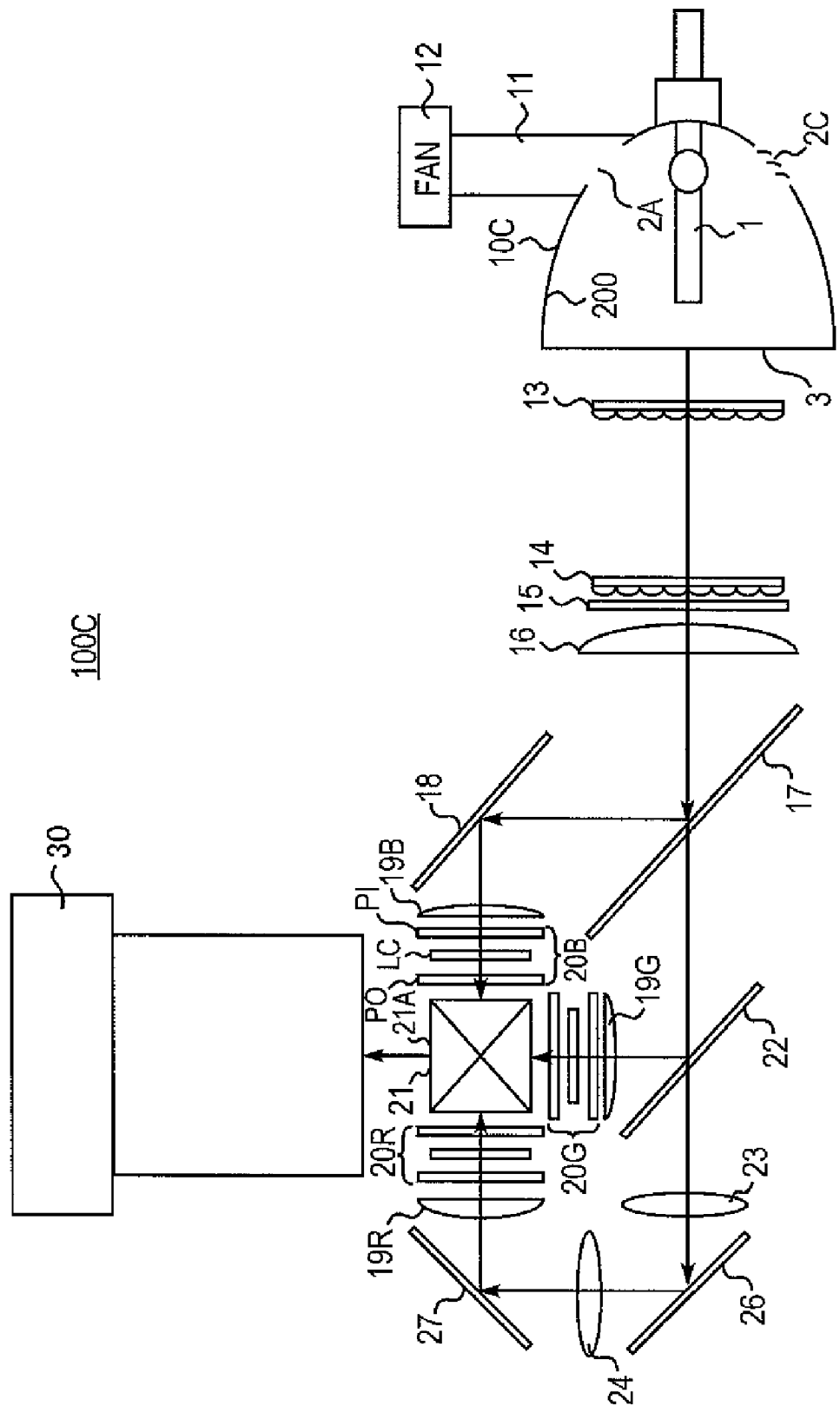
FIG. 8 is a schematic view of a projection display according to the fourth embodiment.

FIG. 8 is a schematic view of a projection display according to the fourth embodiment. The projection display 100C according to the fourth embodiment is identical to the projection display 100 shown in FIG. 1 except for a light source 10C as a substitute for the light source 10.

The light source 10C is identical to the light source 10 shown in FIG. 1 except for a metallic reflector 200 as a substitute for the metallic reflector 2 of the light source 10. The metallic reflector 200 is identical to the metallic reflector 2 shown in FIG. 1 except for an additional opening 2C.

Figure 9:
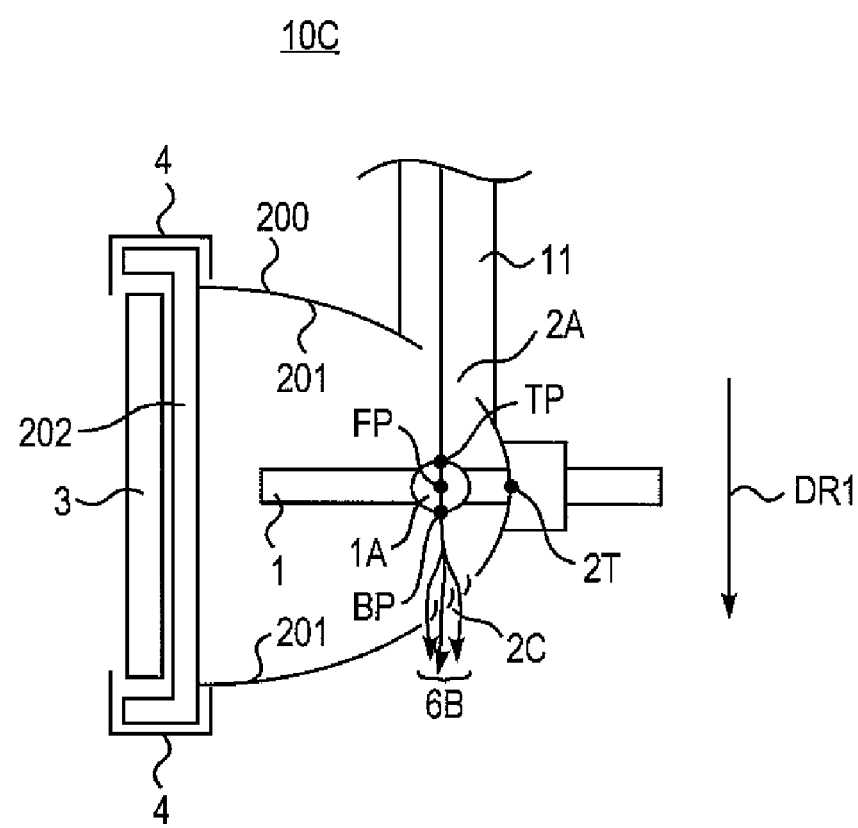
FIG. 9 is a schematic view describing a light source shown in FIG. 8 in detail.

FIG. 9 is a schematic view describing the light source 10C shown in FIG. 8 in detail. Referring to FIG. 9, the opening 2C is provided at an approximately opposed position to the opening 2A with the focal point FP at the center thereof in the gravity direction DR1. The opening 2C including slits allows the air directed through the duct 11 and opening 2A by the fan 12 to be released from the opening 2C as shown by arrow 6B out of the metallic reflector 200 as well as reflecting the white light emitted from the light-emitting point 1A of the lamp 1 into the metallic reflector 200. In this case, the reflection by opening 2C collimates the white light.

As discussed above, in the fourth embodiment the openings 2A and 2C, which are provided at the approximately opposed positions to each other with the focal point FP of the metallic reflector 200 at the center thereof, cool the light-emitting point 1A of the lamp 1 effectively, while the metallic reflector 200 (including the opening 2C) reflects the white light emitted from the lamp 1 so as to generate collimated white light.

Therefore, it is possible to cool the lamp 1 effectively without reducing lightness of images to be projected on the screen.

The other elements of the fourth embodiment are the same as those of the first embodiment.

The Fifth Embodiment

Figure 10:
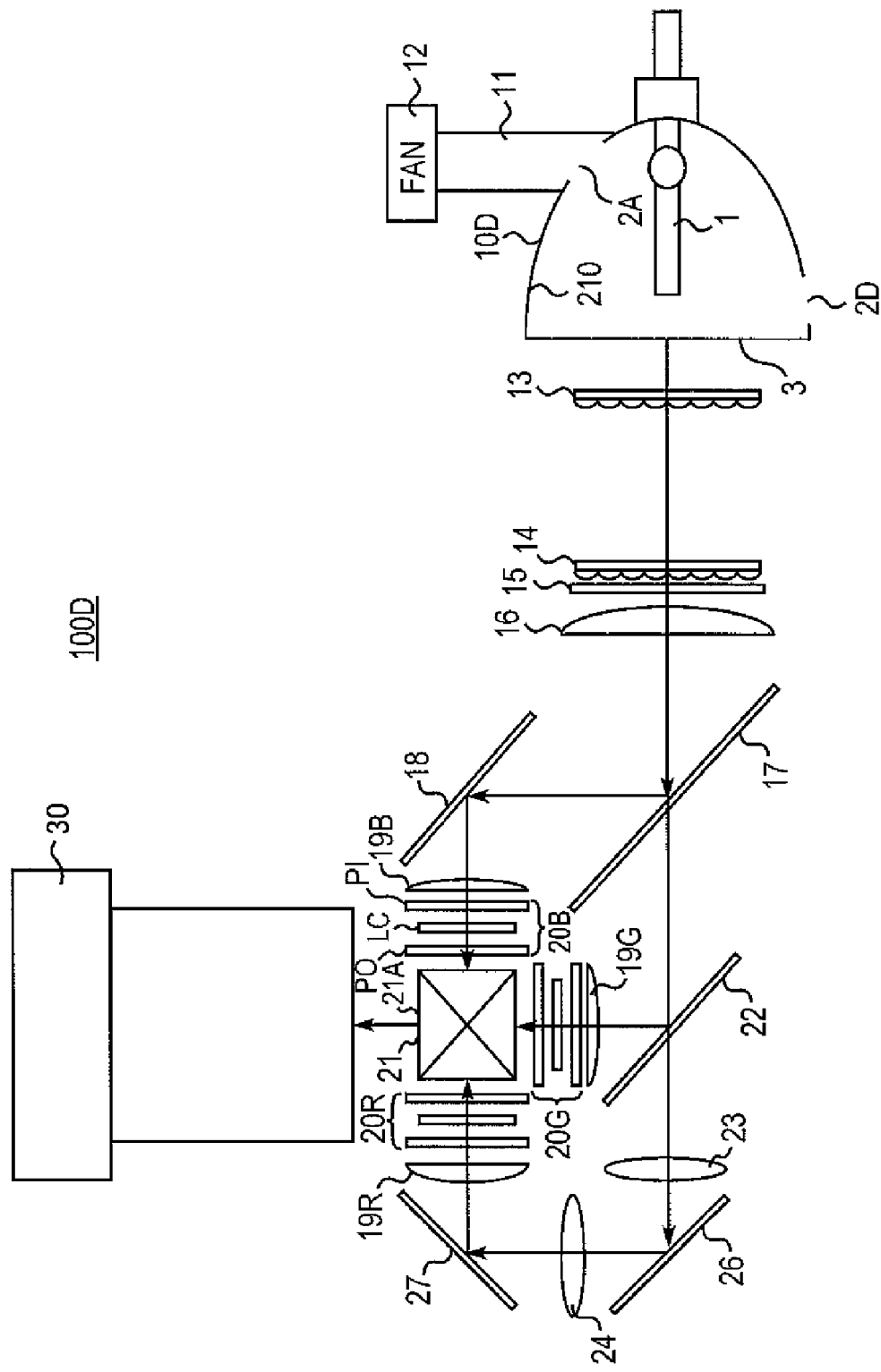
FIG. 10 is a schematic view of a projection display according to the fifth embodiment.

FIG. 10 is a schematic view of a projection display according to the fifth embodiment. Referring to FIG. 10, the projection display 100D according to the fifth embodiment is identical to the projection display 100 shown in FIG. 1 except for a light source 10D as a substitute for the light source 10 of the projection display 100.

The light source 10D is identical to the light source 10 shown in FIG. 1 except for a metallic reflector 210 as a substitute for the metallic reflector 2. The metallic reflector 210 is identical to the metallic reflector 2 shown in FIG. 1 except for an additional opening 2D.

Figure 11:
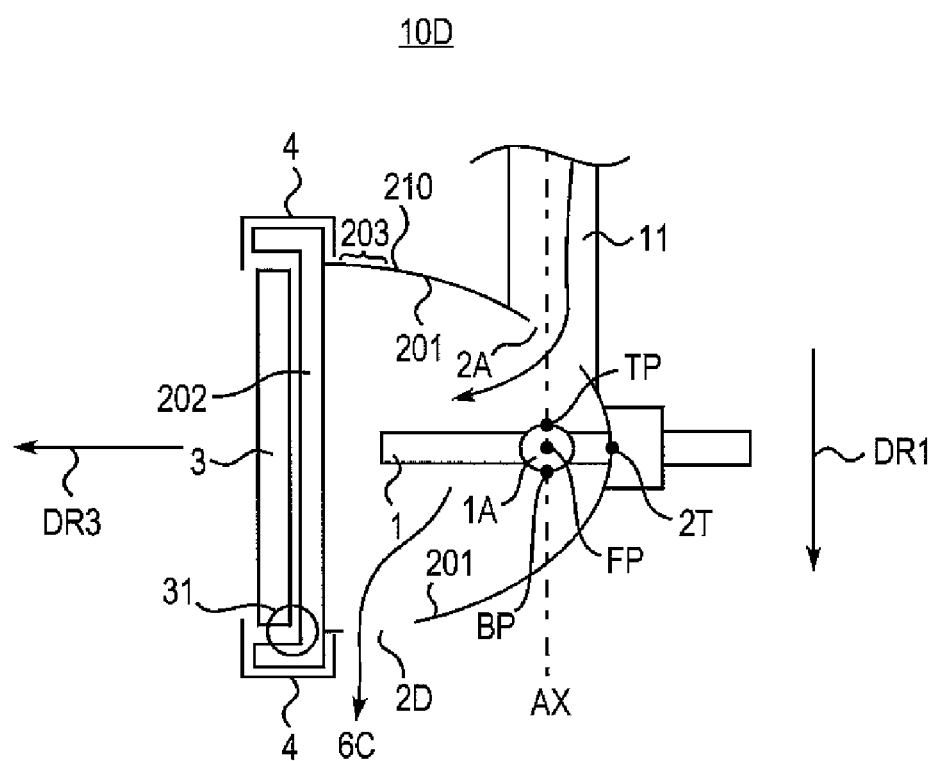
FIG. 11 is a schematic view describing a light source shown in FIG. 10 in detail.

FIG. 11 is a schematic view describing the light source 10D shown in FIG. 10 in detail. Referring to FIG. 11, the metallic reflector 210 includes a part 203 which is approximately straight in cross section in a direction DR3 in which the white light emitted from the light source 10D travels. The part 203 hardly reflects the white light emitted from the lamp 1.

The opening 2D is provided below the focal point FP of the metallic reflector 210 in the gravity direction DR1 and in the vicinity of a contact part 31 in which the front glass 3 makes contact with the flange 202 of the metallic reflector 210. In other words, the opening 2D is provided on the part 203, which is positioned below the focal point FP of the metallic reflector 210 in the gravity direction DR1 and is approximately straight in cross section. The opening 2D has a diameter, for example, of 3 mm.

The air induced into the metallic reflector 210 through the duct 11 cools the light-emitting point 1A of the lamp 1 from the top part TP to the bottom part BP, and subsequently is released from the opening 2D out of the metallic reflector 210 as shown by arrow 6C.

As discussed above, in the fifth embodiment, the air induced into the metallic reflector 210 through the opening 2A provided above the light-emitting point 1A of the lamp 1 cools the light-emitting point 1A from the hotter part (i.e. top part TP) and then is released out of the metallic reflector 210 through the opening 2D provided on the part 203 which contributes little to reflect the white light emitted from the lamp 1.

Therefore, it is possible to cool the lamp 1 effectively without reducing lightness of images to be projected on the screen.

The other elements of the fifth embodiment are the same as those of the first embodiment.

The Sixth Embodiment

Figure 12:
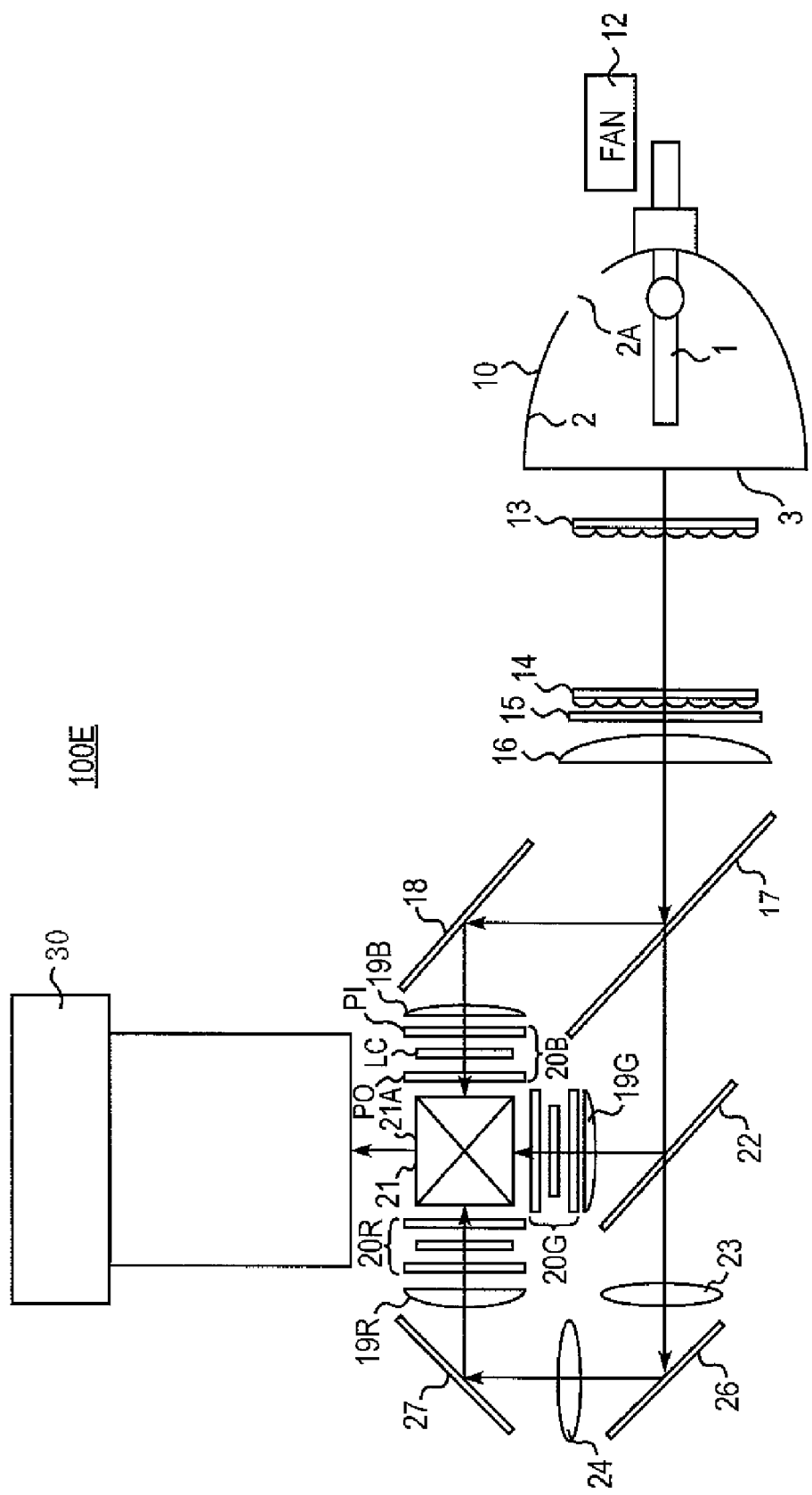
FIG. 12 is a schematic view of a projection display according to the sixth embodiment.

FIG. 12 is a schematic view of a projection display according to the sixth embodiment. Referring to FIG. 12, a projection display 100E according to the sixth embodiment is identical to the projection display 100 shown in FIG. 1 except that the duct 11 is removed and the fan 12 is moved behind the light source 10 (i.e. rearward in the traveling direction of the white light emitted from the light source 10).

Figure 13:
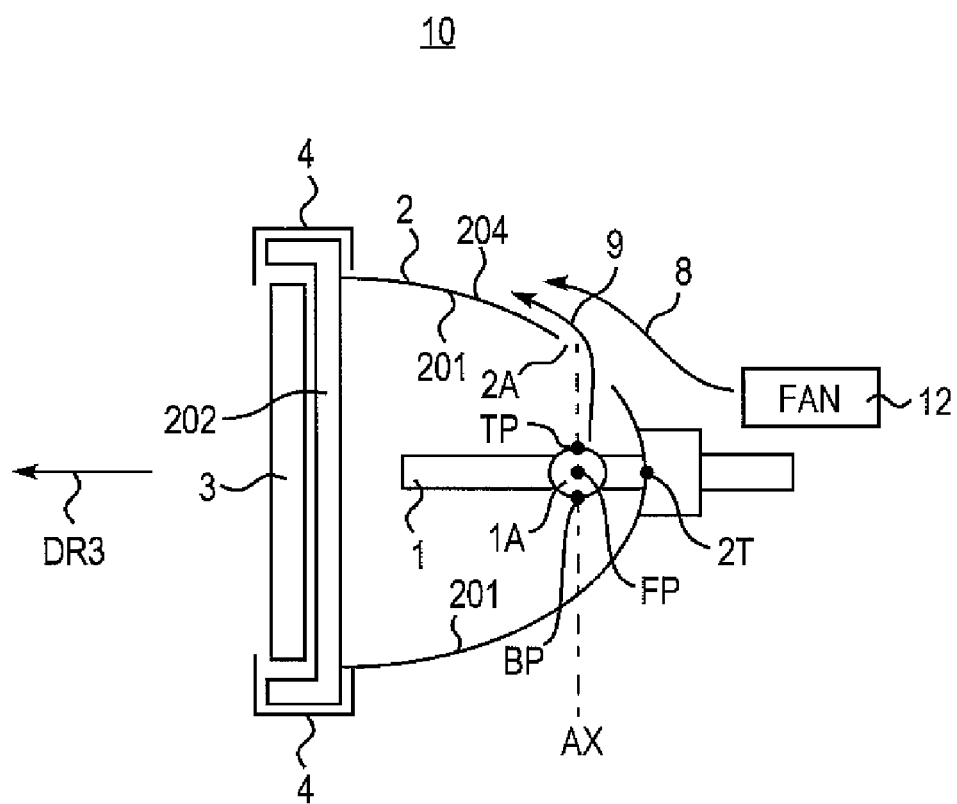
FIG. 13 is a schematic view describing a light source and fan shown in FIG. 12 in detail.
Figure 14:
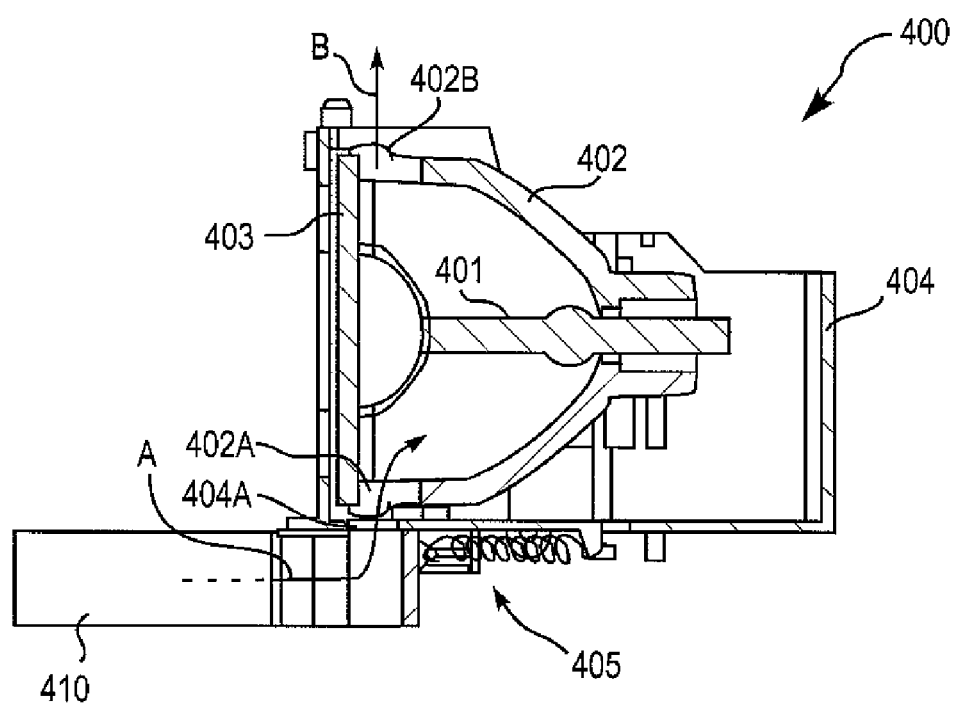
FIG. 14 is a schematic view illustrating a conventional light source device.

FIG. 13 is a schematic view describing the light source 10 and fan 12 shown in FIG. 12 in detail. Referring to FIG. 13, the fan 12 is disposed rearward more than the top 2T of the metallic reflector 2 (i.e. at a rear position in the traveling direction DR3 of the white light). The fan 12 blows air toward the opening 2A along an outer peripheral surface 204 of the metallic reflector 2.

Since the top part TP of the light-emitting point 1A rises in temperature to 800 to 900 degrees C. as discussed above once the lamp 1 lights up, the air around the light-emitting point 1A is heated up, thereby easily flowing from the inside to the outside of the metallic reflector 2. Especially, the opening 2A provided above the light-emitting point 1A facilitates the air, which is heated up by the light-emitting point 1A, to be released through the opening 2A out of the metallic reflector 2. The air flowing out from the metallic reflector 2 is blown away, as shown by arrow 9, by air 8 from the fan 12.

Consequently, the air heated up by the light-emitting point 1A does not stay inside of the metallic reflector 2, thus the lamp 1 and metallic reflector 2 are prevented from rising in temperature.

Therefore, it is possible to cool the lamp 1 effectively.

The other elements of the sixth embodiment are the same as those of the first embodiment.

In the present invention, the fly-eye lenses 13 14, and polarizing converter 15, condenser lenses 16, 19B, 19G, 19R, and dichroic mirrors 17, 22, and total reflection mirrors 18, 26, 27, and liquid crystal display elements 20B, 20G, 20R, and dichroic prism 21, lenses 23, 24 and projection lens 30 comprises "a projection unit" projecting images on the screen with the white light emitted from the light source 10, 10A, 10B, 10C or 10D.

Although the opening 2A is provided above the focal point FP of the metallic reflector 2, 20, 200 or 210 in the gravity direction DR1 in the above embodiments, the present invention is not limited to this. The opening 2A may be provided at an intersection of a straight line that passes through the focal point FP in a direction perpendicular to the traveling direction of the white light emitted from the light source 10, 10A, 10B, 10C or 10D and the metallic reflectors 2, 20, 200 or 210.

The opening 2A is preferably provided at the intersection positioned at the same level of or higher than the focal point FP in the gravity direction DR1.

The present invention is applied to a projection display to prevent the reflector from damage and improve cooling effect on the lamp.

It should be understand that the embodiments disclosed herein are to be taken as examples in every point and are not limited. The scope of the present invention is defined not by the above described embodiments but by the appended claims. All changes that fall within means and bounds of the claims, or equivalence of such means and bounds are intended to be embraced by the claims

What is claimed is:

1. A projection display with direct light source cooling means comprising:
a light source emitting white light;
a projection unit projecting images on a screen by using the white light; and
a cooling unit cooling the light source, wherein
the light source includes:
a lamp; and
a metallic reflector reflecting the white light emitted from the lamp, collimating the white light and directing the collimated white light to the projection unit,
the lamp has a light-emitting point disposed on a focal point of the metallic reflector,
the metallic reflector has a first opening section provided at an intersection of the metallic reflector and a straight line passing through the focal point in a direction perpendicular to the direction in which the collimated white light travels and a second opening section on a surface opposite to the first opening section, wherein
the cooling unit cools the lamp and/or metallic reflector through the first opening section, wherein the first opening section is disposed above the focal point in the gravity direction, and
wherein
the cooling unit includes:
a duct having an end coupled to the first opening section; and
a fan blowing air into the metallic reflector through the duct and first opening section.

2. The projection display according to claim 1, wherein the light source further includes a glass provided on a side from which the collimated white light is emitted, the glass and the metallic reflector make a contact part including a through-hole extending in and out of the metallic reflector.

3. The projection display according to claim 1, wherein said second opening section is provided with the focal point at a center thereof in the gravity direction.

4. The projection display according to claim 3, wherein the light source further includes a reflecting mirror provided outside of the second opening section and reflecting the white light from the lamp into the metallic reflector.

5. The projection display according to claim 1, wherein the light source further includes a glass provided on the side from which the collimated white light it emitted, and said second opening section is provided with the focal point at a center thereof in the gravity direction.

6. The projection display according to claim 5, wherein the metallic reflector has a flange part in approximately a straight line direction in which the collimated white light travels, and is positioned in the vicinity of the contact part of the glass and metallic reflector, and wherein the second opening section is provided on the flange part.

* * * * *